United States Patent
Colbath et al.

(10) Patent No.: US 6,311,182 B1
(45) Date of Patent: *Oct. 30, 2001

(54) VOICE ACTIVATED WEB BROWSER

(75) Inventors: Sean C. Colbath, Boston; David Stallard, Cambridge; Cecile Pham, Norwood; Long Nguyen, Medford, all of MA (US)

(73) Assignees: Genuity Inc., Burlington, MA (US); GTE Service Corporation, Irving, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/971,606

(22) Filed: Nov. 17, 1997

(51) Int. Cl.$^7$ .................................................. G06F 17/30
(52) U.S. Cl. ...................... 707/6; 707/3; 707/5; 704/231; 379/900
(58) Field of Search ................................. 707/10, 1, 102, 707/104, 3, 4, 5, 6; 704/9, 3, 10, 231, 233, 246, 247; 379/900, 907

(56) References Cited

U.S. PATENT DOCUMENTS

| | | | | |
|---|---|---|---|---|
| 5,732,393 | * | 3/1998 | Aoshima | 704/246 |
| 5,802,526 | * | 9/1998 | Fawcett et al. | 707/104 |
| 5,819,220 | * | 10/1998 | Sarukkai et al. | 704/243 |
| 5,845,074 | * | 12/1998 | Kobata | 707/10 |
| 5,915,001 | * | 6/1999 | Uppaluru | 379/88.2 |
| 5,918,223 | * | 6/1999 | Blum et al. | 707/1 |
| 5,960,399 | * | 9/1999 | Barclay et al. | 704/270 |
| 5,963,965 | * | 10/1999 | Vogel | 707/501 |
| 6,101,473 | * | 8/2000 | Scott et al. | 704/275 |

OTHER PUBLICATIONS

Madeleine Bates, Models of Natural Language Understanding, Voice Communication Between Humans and Machines, David B. Roe and Jay G. Wilpon (eds.), National Academy Press, Washington, DC, pp. 238–253, 1994.

G. David Forney, Jr., The Viterbi Algorithm, Proc. Of the IEEE, vol. 61, No. 3, pp. 268–278, Mar. 1973.

(List continued on next page.)

*Primary Examiner*—Jean R. Homere
*Assistant Examiner*—Greta L. Robinson
(74) *Attorney, Agent, or Firm*—Leonard Charles Suchyta; James K. Weixel

(57) ABSTRACT

A voice activated and operated Internet web browser where voiced utterances are digitized and the digitized representation is input to a speech recognition program is disclosed. The speech recognition program determines the most likely set of words from a stored vocabulary making up the utterances. The words are analyzed and searched against a database of topics or micro-domain areas. If a match occurs the words are analyzed by a subprogram associated with the specific topic area and key words are identified and other words discarded. The key words are input to a search engine or the equivalent. The search engine returns information associated with the topic. If no topic match is found a general search on the recognized words is performed. The recognized words are fed to a identification module where key words are extracted that are associated with names of people, organizations, locations, and companies; times; money amounts; percentages; dates; and not-a-name. The extraneous not-a-name words are discarded and the remaining key words are passed to a search engine. The search engine returns with web pages or other such information are found and displayed to the user. The user may re-run the identification module for marking hyperlinks for more particular information.

7 Claims, 4 Drawing Sheets

OTHER PUBLICATIONS

John Makhoul and Richard Schwartz, State of the Art in Continuous Speech Recognition, Proc. Natl. Acad. Sci. USA, vol. 92, pp. 9956–9963, Oct. 1995.

J. Robin Rohlicek et al., Continuous Hidden Markov Modeling for Speaker–Independent Word Spotting, IEEE Intl. Conference on Acoustics, Speech, and Signal Processing, Glasgow, Scotland, pp. 627–630, May 1989.

SRA International, Inc., Name Tag™, Product Brochure.

Charles T. Hemphill et al., Speech–Aware Multimedia, IEEE Multimedia, pp. 74–77, 1996.

Rudnicky et al., "Speechwear: A Mobile Speech System", pp. 538–541 vol. 1 IEEE electronic library, Oct. 3, 1996.*

* cited by examiner

VOICE ACTIVATED WEB BROWSER

RELATED APPLICATIONS

Priority is claimed under 35 U.S.C. § 119 (e) for the present invention from a Provisional Application filed on Nov. 18, 1996 of the same title and inventors as the present application.

FIELD OF INVENTION

This invention relates to the general field of Internet web browsing or searching for particular web pages or other information references. More particularly, the present invention is related to speech recognition, and to identification and isolation of key words from that speech, and passing those words to web search engines or other such search functions as found on web-browsers

BACKGROUND OF INVENTION

Herein web-browsing is defined as finding information documents or web-pages on the Internet associated with a given technical or other such criteria of interest to the user. The primary mechanism to search for specific web-pages is to key in search strings of characters to a search engine or the equivalent in a commercially available browser. The searching provides a list of hits or matches, and the specific text or web-pages can be displayed. Any of the listed web pages can be brought up on the screen by known methods, e.g. "pointing and clicking" on words that are "linked" (hypertext links) to classes of information desired and bringing up those web pages on the user's screen if desired or at least bring up the text on the user's screen if graphics are not available to the user. Such web-browsing can be done in general areas or in specific topical areas. The topical areas, herein defined as micro-domains, are usually areas, like the weather, stocks, sports, finance, news, etc., in which specific search protocols with particular search requirements and formats have been developed.

Herein search facilities is defined broadly including any searching mechanism useful on the Internet. Included are specific search engines, such as AltaVista, Infoseek, Lycos, and search capabilities buried within other databases on other Internet sites.

There has been some disclosure of systems accepting voiced inputs from which searches are made. One such system, called "Galaxy", was developed as a "natural language" system at MIT. This system is an independent browser that is not useful with the existing browsers on the market. This is a limitation since a significant amount of work must be accomplished to allow "Galaxy" to perform searches outside some specific domains for which "Galaxy" has been specifically programmed to understand.

It is an object of the present invention to provide a voice to text search string suitable for inputting into any of the commercially available search engines or databases available on the Internet.

It is yet another object of the present invention to provide web searches over specific domain names and for general searches.

Another object of the present invention is to identify key words and to identify extraneous words where the key words delivered to the search engine and the extraneous words deleted.

It is another object of the present invention to arrange the key words into search strings formatted for specific domain names.

It is yet another object of the present invention to allow search results to be re-run to identify links.

SUMMARY OF THE INVENTION

The foregoing objects are met in a method and apparatus including, means for providing search words to a search facility operating on the Internet from input voiced utterances. The voiced utterances are fed to a statistical speech recognizer where the words that were most likely voiced are determined. A database is formed of a list of words defining specific subject topics or micro-domain (see definition below) names, e.g. weather, stocks, news, and the like. The uttered words are compared to the database words. If a match is found a set of key words are specified and formatted by a subprogram associated with the topic or micro-domain. The set of key words is input to a search engine or other such search facility. The search facility or search engine returns the information about that micro-domain.

If a match to a specific topic or micro-domain is not found. a general search of the recognized words is performed. The recognized words are input to a identification module program where particular word groups are recognized. In a preferred embodiment these groups include, but are not limited to: names of people, places, organizations and companies; times; dates; percentages; and amounts of money. The key words are identified and other words are dropped. The string of search words is delivered to a search engine or other such search facility and the search engine returns the results to be displayed, preferably, on the user's monitor. The search engine may retrieve web pages found which are displayed for the user. There may be words returned that are highlighted and further searched via the identification module to be used as links for greater particularity and more detailed information.

In operation, a user speaks into electronic equipment or other such apparatus that converts the utterances into electrical signals. The utterances are passed to a speech recognizer that accepts natural continuous speech patterns and generates search words that are passed eventually to search engines. Such equipment and speech recognition software are known and in common use in the field.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1:
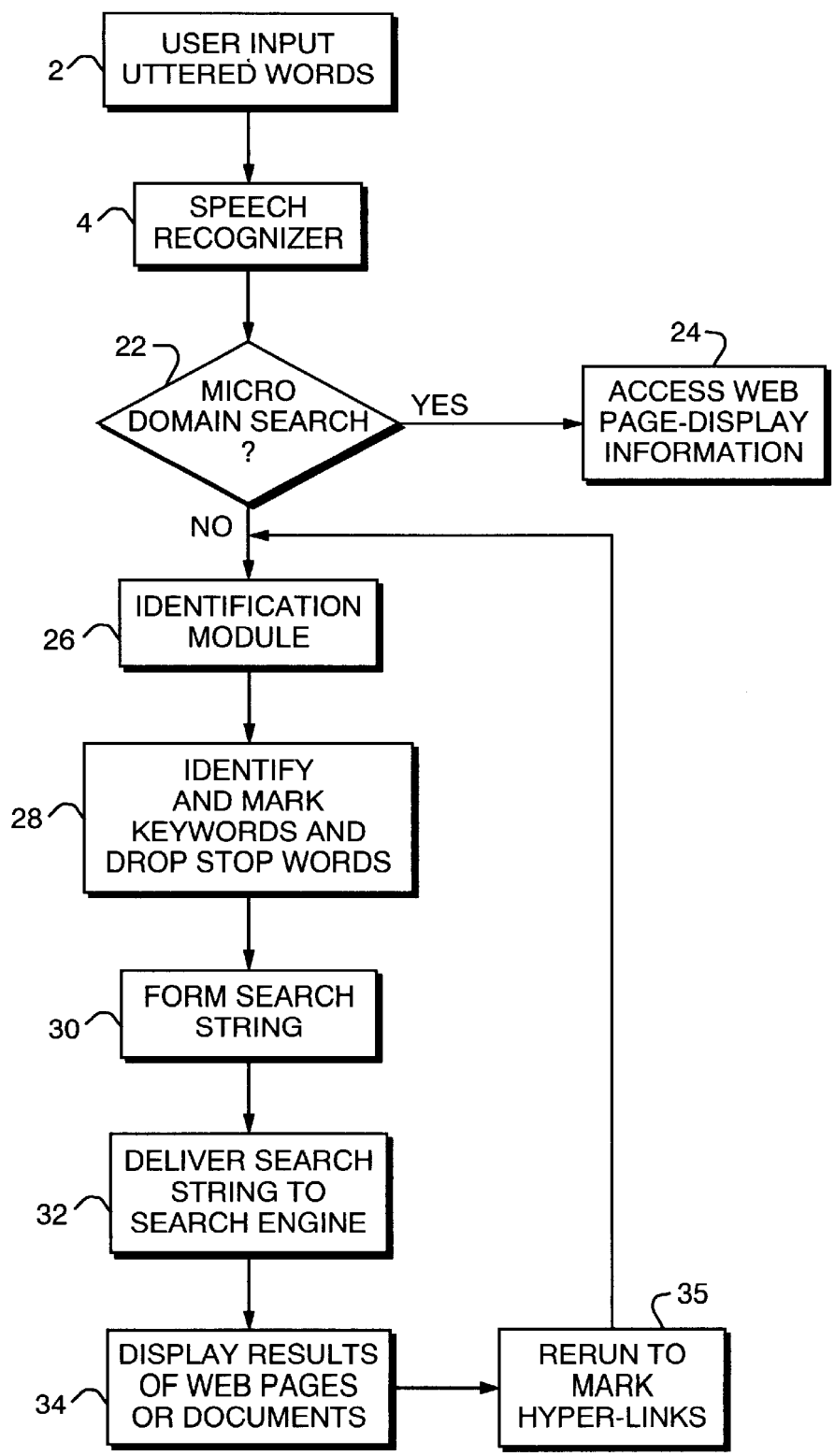
FIG. 1 is a functional block diagram of the overall system.

FIG. 1 is a flow chart of a preferred embodiment of the present invention. A user wanting to voice browse the Internet speaks 2 into electronic apparatus that converts the utterances into an electrical signal representation. Such equipment is known and in common use in the field. The representations are input into a speech recognizer 4 that accepts natural continuous speech patterns and generates the most probable words uttered. These most probable word strings are searched. Although the Internet is referenced herein, there could be other communications facilities where the present invention could be used to advantage. The output from the speech recognizer is searched 22 against a database of topics stored in a previously formulated and stored list. This list is herein defined as a micro-domain list of topics. This list is composed of templates representing natural utterances that a user would utilize when asking for weather, stocks, financial information, news, and the like. If a match is found then the particular micro-domain web page of interest and the information 24 are displayed, as described later herein.

Still referring to FIG. 1, if a micro-domain topic match is not found, a more general search will be performed. The recognized string of words is passed to a keyword identifier module 26 for processing. Key words are identified and marked and recognized utterances which are not useful or will not add to the definition of the search areas are dropped 28. The resulting string of words 30 is formed and then passed to a search engine 32. The search engine locates pages in the web or documentation that correspond to the area of interest and the results are displayed on the user's computer monitor 34.

The forming of the search string of words 30 actually circumscribes words that were identified from the utterance, with starting and ending positions which may related to the numbers positions of each letter (printable characters including spaces, etc.) of an ordered character sequence of the utterance. For example, if the utterance is, "I want to know about the merger between NYNEX and Bell Atlantic", including spaces, there are sixty three (63) character positions. The words identified by the Identification Module would by NYNEX and Bell Atlantic as the names of companies. NYNEX would be identified by the number (41, 45) and Bell Atlantic by the numbers (51, 63). These are the starting an ending character positions of the names in question. The numeric positions are then used to insert double quotes into the text stream before it is passed to the search engine. Of course, in other preferred embodiments, other artifacts than double quotes may be used to indicate these compound nouns. This process is referred to as double quoting words so that particular key words in an utterance are identified to be used by the web browser.

Still referring to FIG. 1, the recognized word string, including the double quoted words is then processed to drop stop words 28. Stop words are words pre-selected by the system designer that will be extracted from all recognized word strings as they have no meaning for the browser. In the above sentence example the stop words are "I want to know about the between and." It should be understood that if stop words have been circumscribed by double quotes, these particular stop words would not be extracted from the utterance as they were deemed essential to the browsing process. For example, if "Boy Scouts of America" is circumscribed by double quotes the word "of" would not be dropped. Given the drop words just found the search string formed for the above sentence would be only the four words MERGER, NYNEX, BELL, and ATLANTIC.

The identification of key words is very important to the searching process. Search engines will return documents based on the number of times a key word is contained in the document. If Bell Atlantic is searched separately for each of the two words there would be found a long list under each of Bell and Atlantic. A feature of the Identifier to circumscribe multiple key words provides the search engine with an important initial level of discrimination, in this example, "Bell Atlantic" together as one "key word."

Still referring to FIG. 1, the results are displayed 34 but may not be of sufficient detail. At this point the user can optionally elect to run the Identification Module 26 again to mark hyper text links 35. The Identification Module will process this text information in the same fashion as it processed the most probable recognized utterance previously described with the result being that certain key words of the text will be highlighted. These highlighted words are hypertext links and the user can select any of these links to display the hypertext. This process can be repeated as the user may desire. These hypertext link words highlighted point to specific classes of subject matter. For example, the link words may point to information about Cities, Locations, Companies, Names of persons, and the like.

Figure 2:
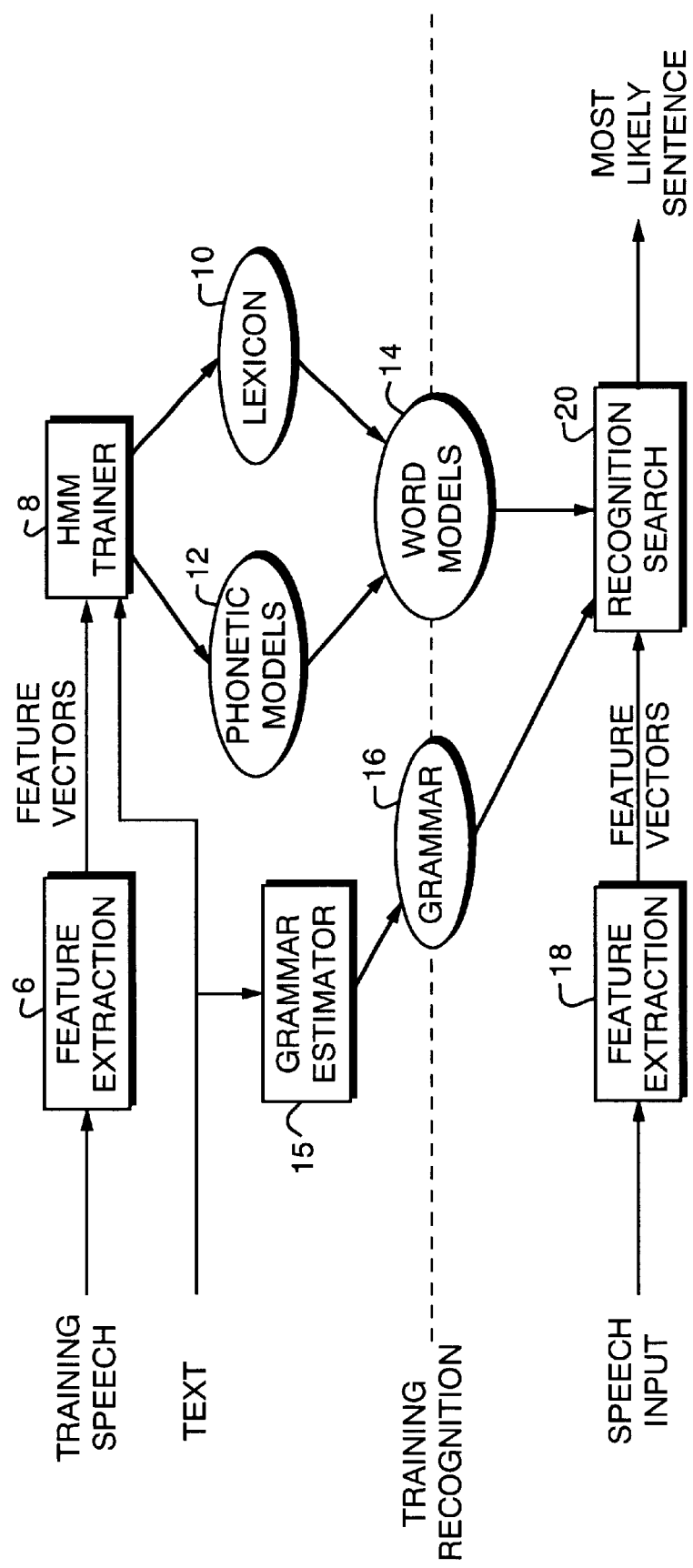
FIG. 2 is a functional block diagram/flow chart of the speech recognizer.

FIG. 2 shows the flow chart for a speech recognizer that is used to advantage within the present invention. Other equivalent speech recognizers known in the art may also be used. A paper entitled, State of the Art in Continuous Speech Recognition, was published in the Proceedings of the National Academy of Science, USA, Vol. 92, pp. 9956–9963, October 1995, authored by John Makhoul and Richard Schwartz. This paper is hereby incorporated by reference herein as if laid out in full. The authors wrote the paper under the auspices of BBN Systems and Technology, Cambridge Mass. GTE Internetworking, Inc. is the successor in interest to BBN Systems and is the assignee of the present patent. The paper discloses three major factors in speech recognition, linguistic variability, speaker variability and channel variability. Channel variability includes the effects of background noise and the transmission apparatus, e.g. microphone, telephone, echoes, etc. The paper discusses the modeling of linguistic and speaker variations. An approach to speech recognition is to use a model, a logical finite-state machine where transitions and outputs are probabilistic, to represent each of the groups of three (or two) phonemes found in speech. The models may have the same structure but the parameters in the models are given different values. In each model there is a hidden Markov model (HMM). HMM is a statistical approach and model that is discussed in detail the above incorporated by reference paper and the references listed therein, and is not be described in depth herein. FIG. 5 of this paper, reproduced herein as FIG. 2, describes an approach to speech recognition. The system is trained by actual speakers articulating words continuously. The audio signal is processed and features 6 are extracted. The signal is often smoothed by filtering by hardware or by software (if digitized and stored), followed by mathematical operations on the resulting signal to form features which are computed periodically, say every 10 or 20 milliseconds or so. Continuous speech is marked by sounds or phonemes that are connected to each other. The two adjacent phonemes on either side of a given phoneme have a major effect, referred to as co-articulation, on the articulation of the center phonemes. Triphoneme is the name given to the different articulation of a given phoneme due to the effects of these side phonemes. The continuous speech is divided into discrete transformed segments that facilitate the several mathematical operations. Many types of features have been used including, time and frequency masking, taking of inverse Fourier transforms resulting in a mathematical series of which the coefficients are retained as a feature vector. The features are handled mathematically as vectors to simplify the training and recognition computations. Other features may include volume, frequency range, and amplitude dynamic range. Such use of vectors is well known in the art, and reference is found the Makhoul and Schwartz paper on page 9959 et seq. The spoken words used in the training are listed in a lexicon 10 and a phonetic spelling of each word is formed and stored 12. Phonetic word models 14 using HMMs 8 are formed from the lexicon 10 and the phonetic spellings 12. These HMM word models 14 are iteratively compared to the training speech to maximized the likelihood that the training speech was produced by these HMM word models. The iterative comparing is produced by the Baum-Welch algorithm which is guaranteed to converge to form a local optimum. This algorithm is well known in the art as referenced in the Makhoul and Schwartz paper on page 9960. A grammar estimator 15 and grammar 16 is established and with the lexicon a single probabilistic grammar for the sequences of phonemes is formed. The result of the recognition training is that a particular sequence of words will correspond with a high probability to a recognized sequence of phonemes. Recognition of an unknown speech begins with extracting the features 18 as in the training stage. All word HMM model sequences allowed by the grammar are searched to find the word (and therefore the triphoneme) sequence with the highest probability 20 of generating that particular sequence of feature vectors. Prior art improvements have included development of large databases with large vocabularies of speaker independent continuous speech for testing and development. Contextual phonetic models have been developed, and improved recognition algorithms have been and are being developed. Probability estimation techniques have been developed and language models are being improved. In addition, computers with increased speed and power combined with larger, faster memories have improved real time speech recognition. It has been found that increased training data reduces recognition errors, and tailored speaker dependent training can produce very low error rates.

Figure 3:
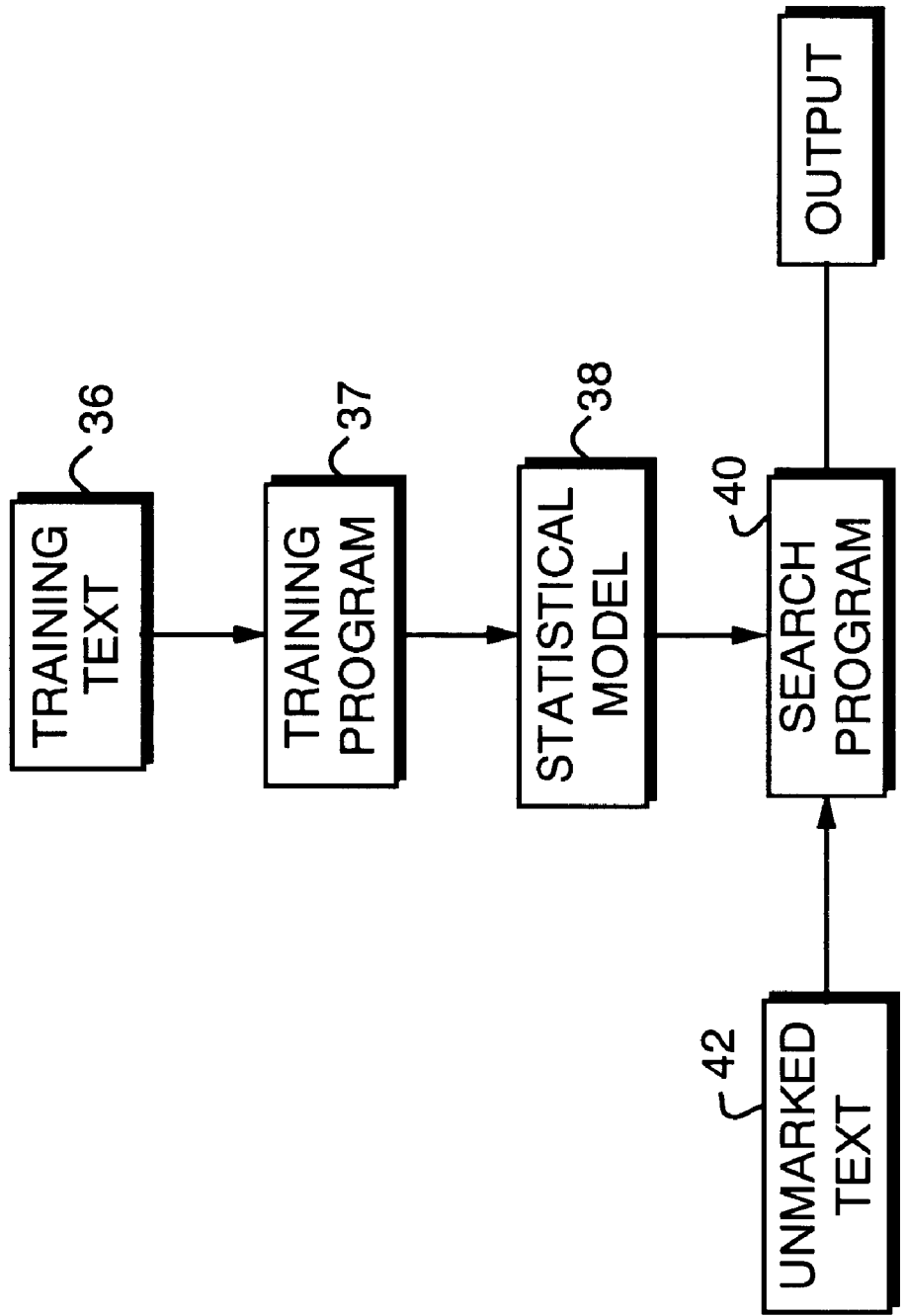
FIG. 3 is a high lever functional block diagram/flow chart of the identification module which is detailed in Appendix A.

FIG. 3 is a high level block diagram of the Identifications Module 26 (of FIG. 1). A paper entitled *Name-finding: a Stochastic Approach* by Daniel M. Bikel describes in detail this Module, and this unpublished paper is attached as Appendix A herein. However, a brief discussion of this paper follows. A Training text 34 is entered into a Training Program 36. Each two word grouping or token of the Training Text has been marked to indicate the token class or state to which it belongs. One preferred embodiment includes states representing, organization names, person names, location names, times, dates, percentages, money amounts, and not-a-name. For example, the following sentence could be marked up with the state in quotes as follows. "IBM Corp.(organization name) located in(not-a-name) New York(location name) said that (not-a-name). . . " The Training Program estimates the parameters of a Statistical Model 38 in the appended paper by Bikel in which are then utilized by the Search Program 40 to create the most likely way to mark up some raw (unmarked) text. Specifically, the unmarked text 42 used as an input to the Search Program is parsed into every possible combination of individual words or groups of words, for example the search program may decide based on some probability to group words together such as "Mr. Smith." Each word or groups of words is then marked in every possible way. For instance, the first word of the text could be selected and would be marked as representing a company name, not-a-company-name, person's name, not-a-person's-name, etc. At the point that the text has been completely marked, the search program utilized the Viterbi Algorithm and the Trained HMM's to determine the most probable manner in which to mark up the text. See the appended Daniel M. Bikel paper sections 3.1 and 3.3. The Viterbi Algorithm is well known in the art of speech recognition. However, other algorithms known that are similar in function to the Viterbi Algorithms that make computations practical may be used to advantage herein.

Figure 4:
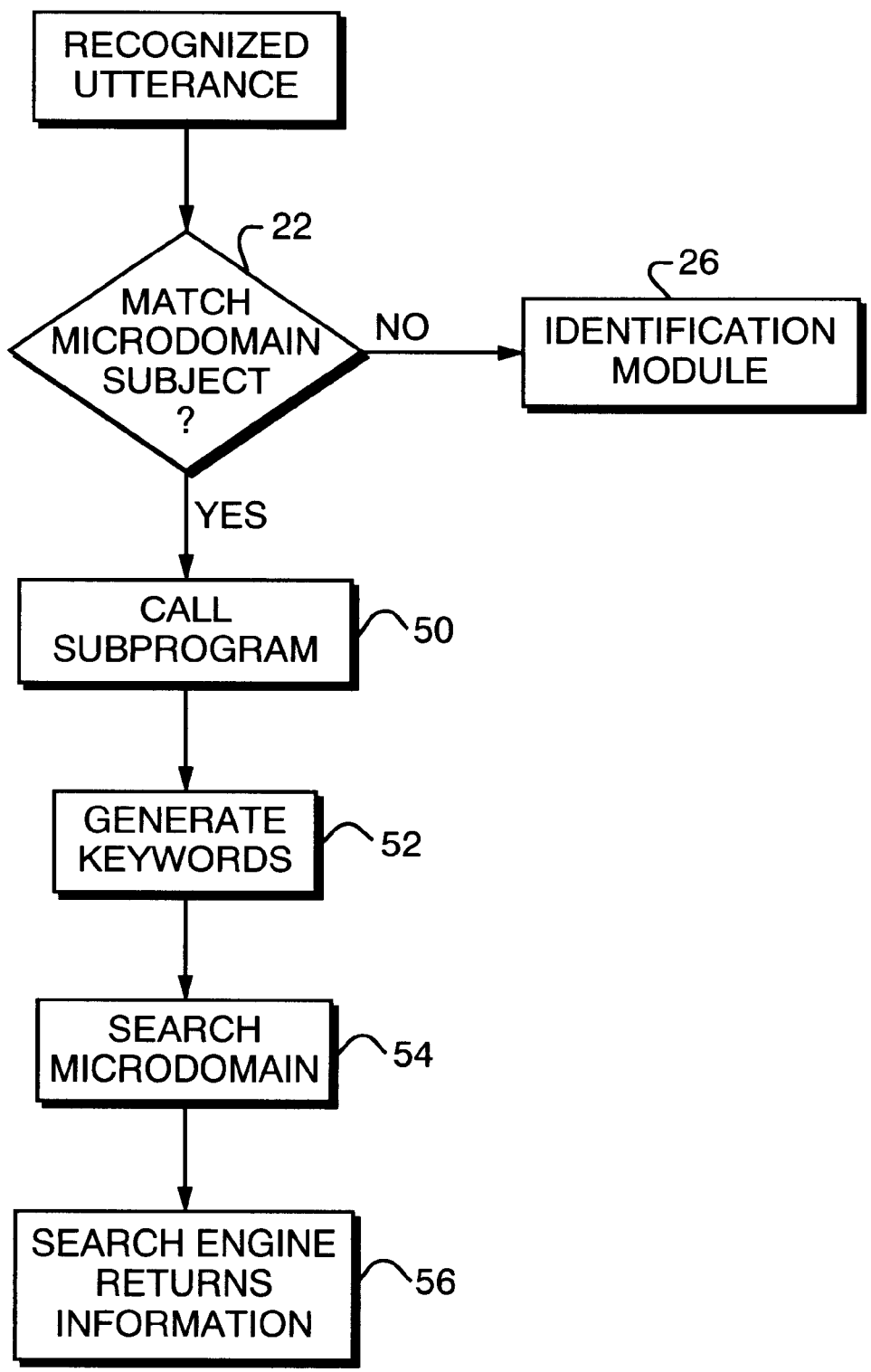
FIG. 4 is a functional block diagram/flow chart of micro-domain search.

FIG. 4 shows the process by which a micro-domain search is conducted. If a match is found to the stored micro-domain subject file list a subprogram is called 50. The file list is composed of templates representing natural utterances that a user would utilized when asking for, for example, information about the weather, stocks, companies, or the like. The subprogram generates key words 52 which are input to a search engine 54 which returns information that is displayed on the user's monitor 56. The formation of the key words passed to search engines or other search facilities may be substantially the same as the key word and drop stop words as describe in FIG. 1 items 28 and 30. The operation of the micro-domain search and the templates is illustrated by the following example: Say a query about the weather is "Show me the current weather in Boston.". This query may appear in code as, (:SEQ(:OPT CURRENT) weather (:OR FORECAST REPORT)@REST)

In this notation ":SEQ" specifies that the following sub-elements must appear in a particular sequence with no intervening words, in this case CURRENT, is considered optional. That is CURRENT could be replaced by YESTERDAY or CURRENT could be deleted. The woe,l "weather" is a constant and would be required to be matched in the weather micro-domain. the ":OR" indicates that the utterance may contain either "Weather Forecast" or "Weather Report" (it is also possible to include the tag ":AND FORECAST" which would indicate that it is necessary for the utterance to include "Weather and Forecast. The @REST portion of the line is a variable parameter and indicates that there could be some other word or words following "FORECAST." In this case "in 'Boston" follows "FORECAST." This formatted sequence of words is referred to as a RULE and each recognized utterance is compared to these "rules" or templates until a match is found. When a match is found the system passes control to a micro-domain handler routine that accessed the particular domain (web page) on the world wide web. The first argument in the handler routine takes the "@REST" portion of the micro-domain RULE as an input and processes the request as illustrated by the following pseudo-code. In the above query the city name is "Boston" and it would be inserted into the end of the first line of code replacing @REST above. A fragment of the Micro-domain Handler code for City Weather might include:

Note: comments are preceded on each line by the # symbol
 proc weather_proc(cityname)
  weathersources=(www.intellicast.com/cities,
   www.weather.com
   www.cnn.com/weather)
first remove the stopwords. In this case, there might be specific
"weather" stopwords that are non-content words only in the context of
weather (for instance, we probably would not normally strip out
"today",
we might in the weather micro-domain
 strip_regular_stopwords(citynames);
 strip_weather_stopwords(cityname);
In micro-domains, you have the ability to check multiple sources on the
net to find your information. We might have three or four weather

```
#sources, if that was not deemed too slow. This is because
    some sites have better coverage, some look nicer, etc.
    For each source
#(weathersources) get the target web page from the server
    retrieve_web_page_(source, tempfile)
#parse it to make it more manipulatible
    pares=parse_htmlfile(tmpfile);
#Go over each link in the page, so we can ignore the fluff.
    For each link
    (parse)
#if the city is mentioned in the text for the link. if (token
    (cityname, link.linktext))
#then show it to the user, and return;
    show_web_page(link.linkurl);
    return;
#We could not find this city on any of our web servers.
    Punt, and call a
#web search engine instead.
    call_web_search_engine(cityname);
```

The Identification Module and the stop word module are utilized by the micro-domain handler as described above- The key words are passed to the search engine by the micro-domain handler and the results of the search are displayed on the users computer monitor.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A method of determining search words from digitized representations of voiced utterances, using a database of preselected words and phrases associated with preselected specific areas of interest, the method comprising the steps of:
   identifying words and phrases in a digitized representation of a voiced utterance;
   comparing said identified words and phrases to said database of preselected words and phrases associated with preselected specific areas of interest;
   determining whether a match exists between said identified words and phrases and said database of preselected words and phrases, the match representing at least one of the preselected specific areas of interest;
   generating, when a match exists, a search string based on the at least one area of interest; wherein, if no match exists, generating a search string comprising:
      classifying parts of said identified words and phrases as at least one of names of people, locations, organizations and companies,
      classifying parts of said identified words and phrases as indicating at least one of times, dates and amounts of money,
      marking all other words in said identified words and phrases as extraneous words, and
      assembling a search string composed of the words and phrases classified as at least one of people, locations, organizations, companies, times, dates and amounts of money; and
   passing said search string to a search facility.

2. The method of claim 1 further comprising the step of:
   receiving and displaying web pages or other information found by said search facility.

3. The method of claim 2 further comprising the steps of:
   selecting from said displayed web page or other information a subset of displayed text from which hypertext links are to be formed;
   classifying parts of said subset of displayed text as at least one of people, locations, organizations and companies;
   marking all other words of said subset of displayed text as extraneous words;
   deleting said extraneous words;
   forming hypertext links composed of the classified parts of said subset of displayed text; and
   passing said hypertext links to a search facility.

4. A method of determining search words from digitized representations of voiced utterances, using a database of preselected words and phrases associated with preselected specific areas of interest, the method comprising the steps of:
   identifying words and phrases in a digitized representation of a voiced utterance;
   comparing said identified words and phrases to said database of preselected words and phrases associated with preselected specific areas of interest;
   determining whether a match exists between said identified words and phrases and said database of preselected words and phrases, the match representing at least one of the preselected specific areas of interest;
   generating, when a match exists, a search string based on the at least one area of interest;
   passing said search string to a search facility;
   receiving and displaying web-pages or information returned by said search facility;
   selecting from said displayed web page or other information a subset of displayed text from which hypertext links are to be found;
   classifying parts of said subset of displayed text as at least one of people, locations, organizations and companies;
   marking all other words in said subset of displayed text as extraneous words;
   deleting said extraneous words;
   forming hypertext links composed of the classified parts of said subset of displayed text; and
   passing said hypertext links to a search facility.

5. An apparatus for determining search words from digitized representations of voiced utterances comprising:
   a speech recognition apparatus outputting digitized representations of voiced utterances;
   a database of preselected words and phrases associated with preselected specific areas of interest;
   a search facility;
   means for identifying words and phrases in a digitized representation of a voiced utterance;
   means for comparing said identified words and phrases to said database of preselected words and phrases associated with preselected specific areas of interest;
   means for determining whether a match exists between said identified words and phrases and said database of preselected words and phrases, the match representing at least one of the preselected specific areas of interest;
   means for generating, when a match exists, a search string of search words;
   wherein if no match exists, the means for generating a search string comprises:
      means for classifying parts of said identified words and phrases as at least one of names of people, locations, organizations and companies,
      means for classifying parts of said identified words and phrases as indicating at least one of times, dates and amounts of money, means for marking all other words in said identified words and phrases as extraneous words, and means to assemble a search string composed of the words identified as at least one of people, locations, organizations, companies, times, dates and amounts of money; and means for passing said search string to said search facility.

6. An apparatus for determining search words from digitized representations of voiced utterances comprising:

a speech recognition apparatus outputting digitized representations of voiced utterances;

a database of preselected words and phrases associated with preselected specific areas of interest;

a search facility;

means for identifying words and phrases in a digitized representation of a voiced utterance;

means for comparing said identified words and phrases to said database of preselected words and phrases associated with preselected specific areas of interest;

means for determining whether a match exists between said identified words and phrases and said database of preselected words and phrases, the match representing at least one of the preselected specific areas of interest;

means for generating, when a match exists, a search string of search words;

means for passing said search string of search words to said search facility;

means for receiving and displaying a web page or other information found by said search facility;

means for selecting from said displayed web page or other information a subset of displayed text from which hypertext links are to be formed;

means for classifying said subset of displayed text to identify at least one of names of people, locations, organizations and companies and all other words as extraneous words;

means for forming hypertext links composed of the identified at least one of names of people, locations, organizations and companies; and means for passing said hypertext links to a search facility.

7. The apparatus of claim 5 wherein the search facility is a web search facility.

* * * * *